United States Patent [19]

Ajdari et al.

[11] Patent Number: 5,593,565
[45] Date of Patent: Jan. 14, 1997

[54] DEVICES FOR SEPARATING PARTICLES CONTAINED IN A FLUID

[76] Inventors: Armand Ajdari, 14, rue de Bellechasse, 75007 Paris; Jacques Lewiner, 7, avenue de Suresnes, 92210 Saint-Cloud; Jacques Prost, 50, avenue Ledru Rollin, 75012 Paris; Jean-Louis Viovy, 26, rue de l'Espérance, 75013 Paris, all of France

[21] Appl. No.: 310,401

[22] Filed: Sep. 22, 1994

[30] Foreign Application Priority Data

Sep. 23, 1993 [FR] France .................... 93 11346

[51] Int. Cl.$^6$ .............. B03C 5/02; B01D 57/02
[52] U.S. Cl. .............. 204/643; 204/601; 204/645; 204/672
[58] Field of Search .............. 204/186, 188–191, 204/302, 183.1, 183.3, 299 R, 451–453, 547, 548, 549, 556, 571, 601–603, 643, 645, 672

[56] References Cited

U.S. PATENT DOCUMENTS

| | | | |
|---|---|---|---|
| 4,204,934 | 5/1980 | Warren et al. | 204/558 |
| 4,390,403 | 6/1983 | Batchelder | 204/547 |
| 4,476,004 | 10/1984 | Pohl | 204/549 |
| 5,151,164 | 9/1992 | Blanchard et al. | 204/451 |
| 5,180,480 | 1/1993 | Manz | 204/644 |
| 5,240,618 | 8/1993 | Caldwell et al. | 210/748 |
| 5,427,663 | 6/1995 | Austin et al. | 204/549 |

FOREIGN PATENT DOCUMENTS

| | | | |
|---|---|---|---|
| 3763378 | 6/1978 | Australia | B01D 21/08 |
| A3080618 | 11/1982 | European Pat. Off. | B03C 5/00 |

*Primary Examiner*—Kathryn Gorgos
*Assistant Examiner*—William T. Leader
*Attorney, Agent, or Firm*—Larson & Taylor

[57] ABSTRACT

In order to separate, within a fluid (1), certain particles (2) contained therein, this fluid is arranged in a corridor (C) partly defined by two faces which are close together and substantially parallel to each other and to the direction of separation E and an exciting field is simultaneously applied to the entire volume of fluid contained in this corridor, according to a direction having at least one component perpendicular to the direction E, which exciting field varies along the said direction in a curve consisting of a regular sequence of mutually identical asymmetric patterns, the mean of this field, taken at each instant along the direction E, being zero, and means are provided for repetitively varying the effect of the exciting field on the particles. The substantially parallel faces may be electrodes between which a potential difference source is connected for producing an electric field thereby exciting particles in the corridor (C). At least one of the electrodes has a corrugated surface with a sequence of asymmetric grooves transverse to the separation direction.

16 Claims, 3 Drawing Sheets

DEVICES FOR SEPARATING PARTICLES CONTAINED IN A FLUID

BACKGROUND OF THE INVENTION

The invention relates to methods and devices for separating, within a fluid, certain particles contained therein, such as, in particular, colloidal particles (pigments, silica or gold grains, latex, etc.) and biological particles (viruses, cells, bacteria, proteins, DNA fragments, etc.) contained in a liquid, or alternatively grains or balls with small diameter (diameters lying, for example, between 0.5 and 5 mm), made of metal, plastic, mineral (silica, etc.), contained in a gas, such as ambient air, or alternatively the components of a gas mixture (oxygen, nitrogen, etc.), or even isotopes contained in a gas, such as the isotopes of uranium contained in the hexafluoride of this metal, or the isotopes of hydrogen (deuterium, tritium), of lithium, of boron, of gadolinium, etc.

The invention more particularly relates to the technique according to which a separation or entrainment field is applied to the fluid in question, contained in a suitable chamber, which field is capable of acting specifically on the particles to be separated so as to displace them from a first zone of the chamber to another zone in which the concentration of these particles increases because of these displacements.

Solutions hitherto proposed for this technique are essentially of three types.

In solutions of the first type, the entrainment field is applied onto the fluid along the actual entrainment direction, between two ends, far apart from each other, of the chamber, and respectively corresponding to its "inlet", or zone intended to be depleted in the particles to be separated, and its "outlet", or zone intended to be enriched in the said particles: such a solution requires a relatively high value for the field, and the increase in this field value is rapidly limited by the price of the corresponding equipment.

In solutions of the second type, the entrainment is obtained by creating an electric wave propagating over the entire length of the chamber (see the article by R. Hagedorn, G. Fuhr, T. Müller and J. Gimsa appearing in pages 49–54 of Volume 13, (1992) of the journal "Electrophoresis").

For this, the said chamber is at least partially given the shape of a corridor partly defined by two faces which are close together and substantially parallel to each other and parallel to the direction E of entrainment or separation and the polarizing field is applied on the volume of fluid contained in the said corridor, along a direction perpendicular to the direction E.

In the embodiments proposed for implementing this second type of solution, the fields in question are electric fields and they must be sequentially distributed between a large number of separate electrodes which are insulated from each other and arranged side by side along the entire length of the corridor.

The resulting equipment is complex and difficult to control.

In the third type of solution, the fluid to be treated is a liquid which is placed in a corridor which is slightly inclined to the horizontal and vertically defined by two parallel electrode plates which are regularly corrugated in symmetric patterns, the projecting zones of the plates being arranged mutually opposite in pairs so as to create a succession of constricted zones and of widened zones (Patent AU-B-37 633/78).

The liquid flows under gravity between the plates because of their inclination and a uniform electric potential is applied between the two plates, which exerts differentiated electrical stresses on the various particles contained in the constricted zones: these differentiated stresses result in a progressive enrichment of the liquid flowing between the plates in certain of the said particles.

SUMMARY OF THE INVENTION

The object of the invention is, above all, to provide another solution for implementing the said field-separation technique, which solution is particularly simple and easy to control.

For this purpose, one or more zones are again provided in the field-separation methods and devices of the type in question, according to the invention, in the chamber which contains the fluid to be treated, which zones are called separation zones and extend in the direction E of entrainment or separation, and an exciting field is also applied simultaneously over the entirety of each zone, which field varies along the direction E in a curve consisting of a regular sequence of essentially mutually identical patterns, the mean of the said exciting field, taken at each instant along the direction E, being essentially zero.

In contrast to the prior art, the said methods are essentially characterized in that the fluid remains stationary in the zone in question, in that the patterns of the sequence are asymmetric and in that means are provided for repetitively varying the effect of the exciting field on the particles contained in the zone in question.

In preferred embodiments of the said methods, one and/or other of the following arrangements is/are employed:

- the means for repetitively varying the effect of the exciting field on the particles to be separated act on the amplitude of this exciting field.

- the means which act on the amplitude of the exciting field employ a repeated sequence of operating cycles, each composed of two phases, the first phase, extending over a first period, consisting in simultaneously applying a pulse of the exciting field over the entirety of each separation zone, and the second phase, extending over a second period, consisting in cancelling the said field,

- in a method according to the preceding paragraph, the duration of the second period of each cycle is of the same order of magnitude as, or shorter than, the diffusion time of the particles to be separated over a distance equal to the pitch of the array consisting of the succession of assymetric patterns,

- the means which act on the amplitude of the exciting field apply this exciting field to each separation zone in a sinusoidal, optionally modulated, manner, the time period of the sinusoidal signal being chosen depending on the particles to be separated,

- the means for repetitively varying the effect of the exciting field on the particles to be separated act on the sensitivity of the said particles to this field,

- in a method according to the preceding paragraph, a sensitizing field is superposed on the exciting field over all the separation zones, which sensitizing field is capable of temporarily inducing transition of the particles to be separated into a state in which their sensitivity to the exciting field is different from that which they have in their ground state, each pattern has the shape of an asymmetric V, the asymmetry of each V, expressed as a ratio between the width of its less steep side and that of its steeper side, is of the order of 10.

As regards the separation devices of the type in question according to the invention, those in which the exciting field is of electric type are essentially characterized in that each separation zone is defined by at least two electrodes, and in that at least one of the said electrodes has a profile, along the direction E, which consists of the above regular sequence of mutually identical asymmetric patterns, which patterns are referred to hereinbelow as "striae".

In preferred embodiments of the said devices, one and/or other of the following arrangements is/are employed:

the pitch of the array of striae lies between a few thousands of ångströms and a few millimeters, the striated electrode has a second, identical striated electrode lying alongside it, which second electrode is offset, in particular by one striation half pitch, with respect to the first, and means are provided for alternately powering these two electrodes, the separation zones have the form of a corridor defined in part by two faces which are close together and substantially parallel to each other and to the direction E of entrainment or separation, and the mean distance between these two faces is of the order of magnitude of the pitch of the array of striae, the two parallel faces which define the corridor are identically striated and are arranged so their edges lie opposite each other in pairs on either side of the said corridor, the corridor consists of a plurality of mutually parallel corridor sections formed according to the preceding paragraph, each electrode lying between two adjacent parallel corridor sections then being in the form of a part lined with striae on two parallel opposite faces, which gives it a general elongate Christmas-tree shape, the electrodes have been subjected to a surface treatment making it possible to prevent adhesion onto them by the particles to be separated.

The invention comprises, apart from these main arrangements, certain other arrangements which will preferably be used at the same time and which will be dealt with more explicitly hereinbelow.

DESCRIPTION OF PREFERRED EMBODIMENTS

Figure 1:
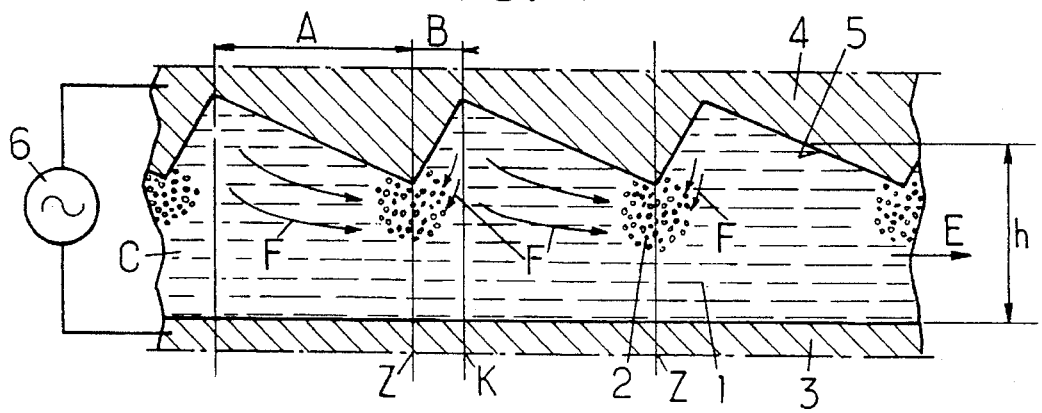
FIG. 1 of these drawings is a highly magnified partial section of a separation device according to the invention.

As stated hereinabove, it is proposed to separate certain particles 2 from a fluid 1 which may be liquid or gaseous, which particles are dissolved or in suspension in this fluid.

The diameter of these particles is small, being in general less than 1 mm, and even less than 0.1 mm, but being capable, in certain cases, of being as high as 3 or even 5 mm.

For this purpose, an exciting field is applied onto the said particles, some of these particles being more sensitive than others, or than the surrounding medium, to this field, and the differentiated exciting effect which results therefrom is used for displacing a majority of the said particles along a given entrainment or separation direction E.

For this purpose, the fluid 1 is arranged in a corridor C of low mean height or width h, which is partly defined by two parallel metal walls 3 and 4 constituting electrodes.

One of these electrodes 3 is flat and the other electrode 4 has, on the side of the corridor C, a "blasé" or striated face 5.

The profile of this face 5 is here an asymmetric sawtooth profile: the width A of the less steep side is much larger than the width B of the steeper side, the ratio A/B being advantageously of the order of 10 or more.

The pitch of the array, which is equal to the sum A+B, typically lies between a few thousands of ångströms and a few millimeters.

The height h is of the same order of magnitude as this pitch.

A potential difference source 6 is connected between the two electrodes 3 and 4. This potential difference or voltage V advantageously varies in the manner illustrated on the graph in FIG. 4a, where the amplitude of the voltage V is plotted on the ordinate and the time t is plotted on the abscissa.

It is seen that the variations in this voltage V are cyclic and that each cycle comprises a first phase, with the duration $t_1$, corresponding to a voltage pulse, which is, in the example, AC, and a second phase, of duration $t_2$, corresponding to an absence of voltage.

Figure 2:
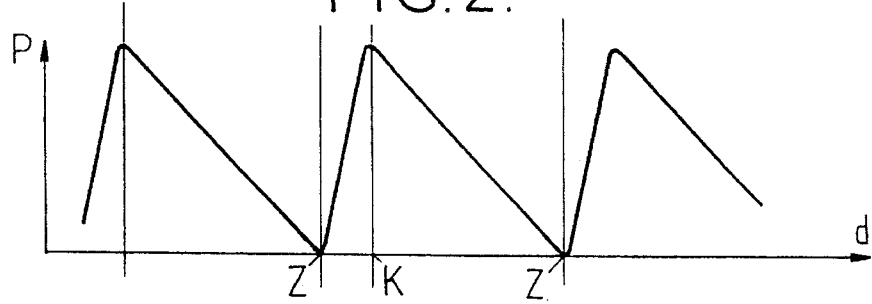
FIGS. 2 and 3 are explanatory graphs.
Figure 3:
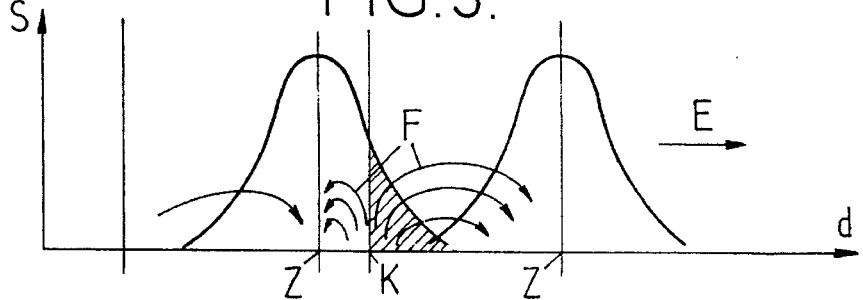

FIGS. 2 and 3 are graphs which make it possible to explain the operation of the particle separation according to the present invention.

In each of these two FIGS. 2 and 3, exactly the same distances d are plotted on the abscissa as in FIG. 1, arranged vertically opposite them.

In FIG. 2, the effective exciting potential P acting on the particles 2 is plotted diagrammatically on the ordinate, that is to say the tendency which each of these particles has to move away from the position in which it is located in order to reach another position.

In FIG. 3, the concentration S in particles which it is desired to separate, at a well-defined instant of the separation process, is plotted on the ordinate.

FIG. 1 corresponds to applying the voltage pulse of duration $t_1$ which creates the exciting field of electrical origin in the fluid 1.

At this instant, the electric field prevailing in the fluid 1 is more intense in the vicinity of the edges of the striated face 5, which are closest to the opposite electrode 3.

The particles 2 to be separated have the characteristic that they have a sensitivity to the electric field which is different from that of the surrounding medium or of the other particles, in the sense that they have a greater tendency than this medium or than these other particles to collect in the concentration zones of the said electric field or, on the other hand, to avoid these zones, which tendency is expressed by the exciting effect represented by the potential P hereinabove.

Purely by way of illustration, it is assumed that the particles 2 considered here have the first of these two characteristics: the particles 2 to be separated are therefore observed to concentrate in the zones Z which lie in the vicinity of the edges of the striae of the blasé face 5.

This concentration occurs through migration of the surrounding particles towards these zones Z, along the arrows F.

As actually seen in FIG. 2, it is towards the zones Z in question, which correspond to constrictions of the corridor and to high electric fields, that the particles have the greatest tendency to migrate in order to collect stably therein; whereas, in contrast, the relative weakness of the electric field in line with the hollows of the striated surface is manifested by a maximum instability of the particles lying in the corresponding regions K.

The said FIG. 2 shows not only the local asymmetries of the exciter potential P, but also the flat, and not inclined, horizontal appearance of its large-scale variations, which corresponds to a zero overall mean of the electric field—that is to say of the variations in the electric potential difference which generates this field—along the general direction of the corridor C at each instant.

At the end of each voltage pulse with duration $t_1$, the electric field is cancelled.

Starting from this instant, and throughout the entire second duration $t_2$ of each cycle, the particles 2 diffuse isotropically on either side of the high-concentration zones Z previously defined.

Just before a new voltage pulse is applied, corresponding to the following cycle, the concentration of the said particles 2 in the fluid 1 is given by bell curves such as those represented in FIG. 3.

When a new voltage pulse of duration $t_1$ corresponding to the following cycle is applied, the above-described asymmetric migrations are again observed towards the high-concentration zones Z which lie in the vicinity of the above edges, this being along the arrows F in FIGS. 1 and 3.

Inspecting FIG. 3, it is seen that this migration has the effect of moving from one of the bells (on the left in FIG. 3) to the other a certain proportion of the particles which were previously found in the first bell, which proportion is schematically represented in the hachured zone on the said FIG. 3.

Clearly, another portion of the particles 2, which is not negligible and may even be the majority, returns to its initial position.

However, the balance is far from being negligible and it is manifested by transfer of particles 2 in the direction the arrow E, that is to say towards the right in the drawings.

This process is repeated for each cycle and for each asymmetric pattern of the electrode 4.

In total, a sequence of focussing/dispersion cycles is observed, each comprising a first, asymmetric focussing phase (extending over a time $t_1$) and ending in an inhomogeneous distribution of the particles to be separated, and a second, symmetric dispersion phase (extending over a time $t_2$) imposed on the entire inhomogeneous-density ensemble thus obtained.

It should be noted that, in order to obtain the overall entrainment effect according to the invention, the particles to be separated must undergo a succession of time periods or phases during which they are in turn focussed asymmetrically in the zones Z (focussing phases), then essentially free to diffuse (dispersion phases), these two types of phase being necessary, since:

if only the focussing phase were employed, an inhomogeneous distribution of the particles to be separated would indeed be obtained, but this distribution would be spatially limited to the dimension of one single asymmetric pattern: the second phase is necessary for exploiting the inhomogeneity produced by extracting from the space corresponding to one pattern a portion of the particles which are located therein in order to make them progress to a neighbouring pattern, if only the dispersion phase were used no directional effect would be observed in the distribution of the particles to be separated, with the changes imposed on a possibly inhomogeneous original distribution altering this distribution identically in both possible directions of displacement of the particles.

In the preferred embodiment described hereinabove, the focussing and dispersion phases are alternated by periodically interrupting the exciting field which is of electrical origin.

Other means for producing this alternation may be employed in the scope of the invention, including suitable temporal modulation of the amplitude of the electric field or the addition of a sensitizer field.

As regards the first means, the AC or DC electric field can be amplitude-modulated, for example sinusoidally, so as to cause focussing of the particles during the periods in which its amplitude is strong and allow them to disperse during periods when its amplitude is weak: the half-period of the modulation then approximately acts as the duration $(t_1+t_2)$ of the above cycles which involve periodic interruption of the electric field.

As regards the second means, the phases can be alternated by adding a sensitizing field to the exciting field.

Such a sensitizing field may, for example, be that produced by irradiation using light radiation capable of bringing the particles into an activated state in which their sensitivity to the electric field is larger than in their basic state, called the ground state, into which state the particles return spontaneously after having spent a certain time in the activated state: the sensitivity difference induced by such activation is manifested by a succession of cycles, each comprising a focussing phase corresponding to a period in which the particles are in their activated state and a dispersion phase corresponding to a period in which the said particles are in their ground state, the relative duration of the two phases in each cycle being controllable by choosing the amplitude of the sensitizing radiation or by periodically interrupting it over time.

It should be noted that, in this latter case for adding a sensitizing field, there is no purpose in temporarily influencing the exciting field of electrical origin for producing the phase alternation and therefore the entrainment effect.

In all cases, the overall displacement along the arrow E is obtained without it being necessary to resort to an entrainment field parallel to the direction of this arrow.

The separation obtained results from the fact that, in the case of particles of which some of the parameters such as diffusion coefficient, electric-field sensitivity, dielectric relaxation time or capacity for being excited by radiation are different, the proportions of these particles which move from pattern to pattern along the arrow E on each cycle are different.

Figure 4:
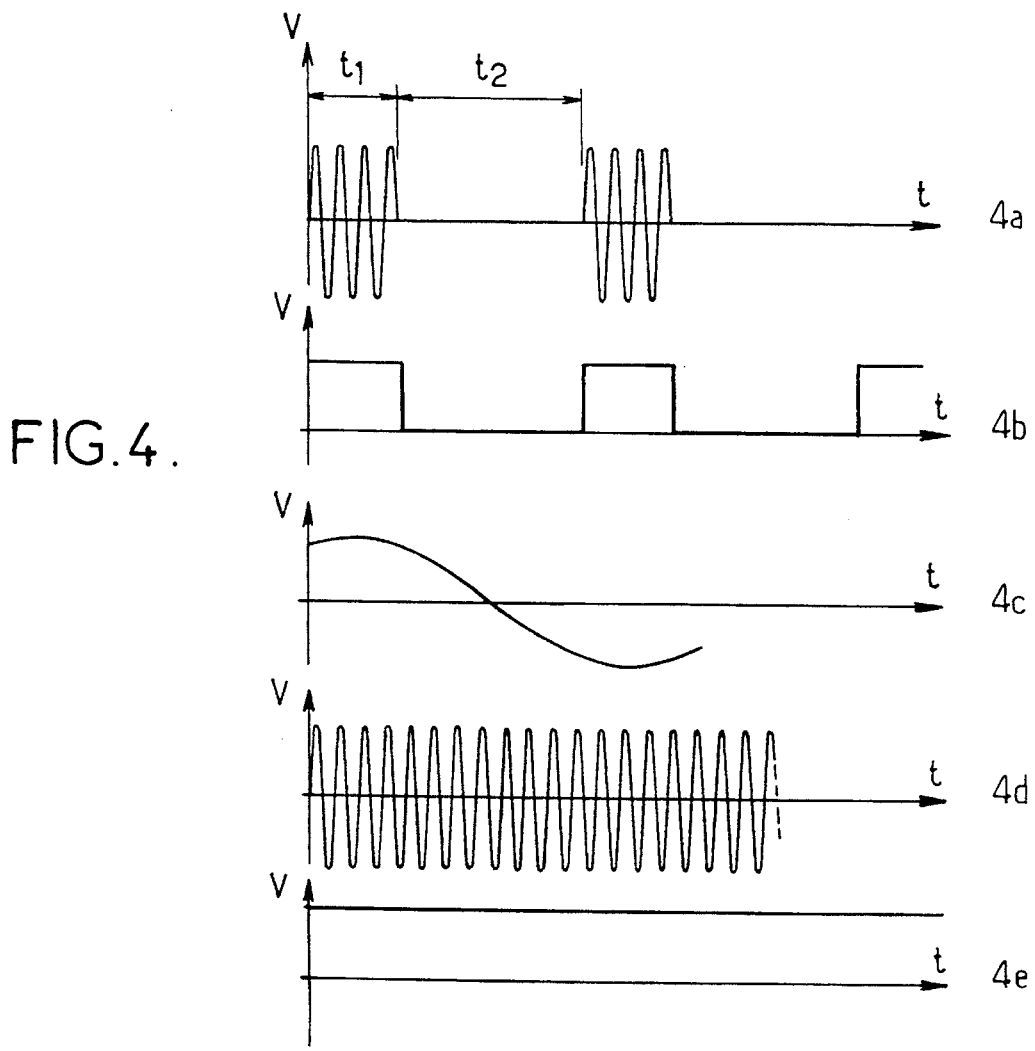
FIG. 4—broken down into five FIGS. 4a, 4b, 4c, 4d and 4e—shows the electric voltage waveforms which can generate the exciting field in the device according to FIG. 1.

FIG. 4 shows preferred temporal sequences for the electric voltage, generated by the generator 6, which creates the exciting field.

In the case of periodic interruption of the electric field, the generator 6 may, for example, deliver:

the voltage shown in FIG. 4a, already discussed hereinabove, corresponding to a series of AC voltage pulses whose frequency may, for example, be of the order of a few hundreds or a few thousands of hertz, or DC voltage pulses, in which case the voltage curve has the appearance of a square zig-zag represented in FIG. 4b.

In each of these two cases, the period $t_2$ of the interruptions is advantageously chosen to be of the same order of magnitude as the diffusion time of the particles over one pitch of the array of striae.

In the case of temporal modulation of the amplitude of the electric field, the generator 6 delivers a modulated voltage, for example a sinusoidal wave as represented in FIG. 4c, the frequency of this sinusoidal wave being, in certain cases, advantageously chosen to be of the order of magnitude of the inverse of the dielectric relaxation time of the particles to be separated or entrained, and the pitch of the array of striae then being chosen such that the diffusion time for one particle over this pitch is of the order of magnitude of the said dielectric relaxation time.

Figure 5:
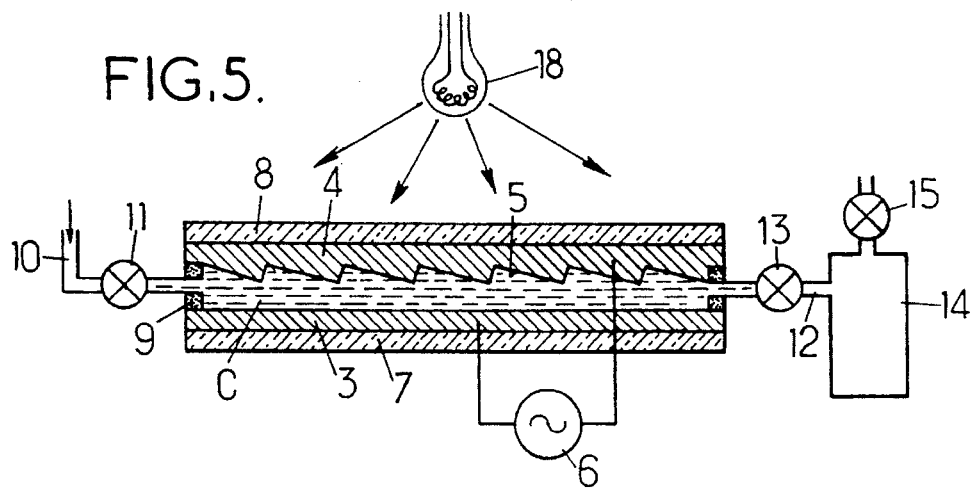
FIG. 5 schematically shows the same device, more completely than in FIG. 1.

In the case of adding a sensitizing field, it is possible, for example, to use, as diagrammatically represented in FIG. 5—which shows, also diagrammatically, but more fully than FIG. 1, an embodiment of the invention—irradiation by sensitizing light radiation coming from a lamp 18: in this case, the lamp 18 is illuminated so as to irradiate the separation zone, and the generator 6 delivers a AC or DC voltage without more particular modulation, for example as represented in FIG. 4d or 4e.

In a preferred embodiment, the power of the radiation supplied by the lamp 18 is chosen so that the dwell time in the ground state for a particle is of the order of magnitude of the diffusion time of this particle over a distance equal to the pitch of the array of striae.

In another preferred embodiment, the lamp 18 radiates a higher power, but is periodically switched off or masked, the duration of the dark periods being advantageously chosen to be of the order of magnitude of the diffusion time of the particles over one pitch of the array of striae.

The two electrodes 3 and 4 and the corridor C are again found in FIG. 5.

The electrode 3 consists, for example, of a conducting and transparent coating, especially of indium tin oxide (ITO), on a glass plate 7.

The blasé conducting array consisting of the electrode 4 is also attached on a glass sheet 8 and formed, in particular, by printing a layer of gold or of aluminium.

The two composite plates defining the corridor C are separated by a spacer frame 9 consisting of an insulating resin.

The corridor C is furthermore connected to an inlet 10 equipped with a valve 11 and to an outlet 12 equipped with a valve 13.

This outlet 12 is itself connected to a collection vessel 14 with access valve 15.

It will be clearly understood that, with such an installation, and, of course, taking the precautions necessary to prevent any backward movement of the particles during separation, it is possible to collect volumes of the fluid 1 enriched in the particles 2 in the vessel 14, the collections of this enriched fluid being compensated for by equivalent inputs of normal fluid at the inlet 10.

In an improved variant, the two electrodes defining the corridor C in which the fluid 1 to be treated is located are defined, on the side of this corridor, by identically striated faces, so that their edges lie transversely opposite each other, which improves the performance of the equipment.

Figure 6:
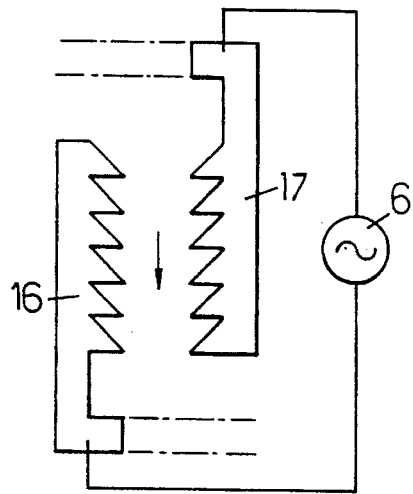
FIGS. 6 and 7 are diagrams representing two variants of separating devices according to the invention.

This is diagrammatically represented in FIG. 6, in which the two striated electrodes, in the form of opposite combs, are respectively denoted by the references 16 and 17.

In this case, the two electrodes 16 and 17 may form the side walls of the corridor C, the other two walls of this corridor advantageously consisting of flat plates of insulating material such as glass or silicon oxide, against one of which the said electrodes are applied.

The said "side walls" defined by opposite striaeted faces, may also have, along the direction perpendicular to the plates, a very small dimension which may be limited to the thickness of a metal etching produced on one of these plates, for example using a lithography process.

Figure 7:
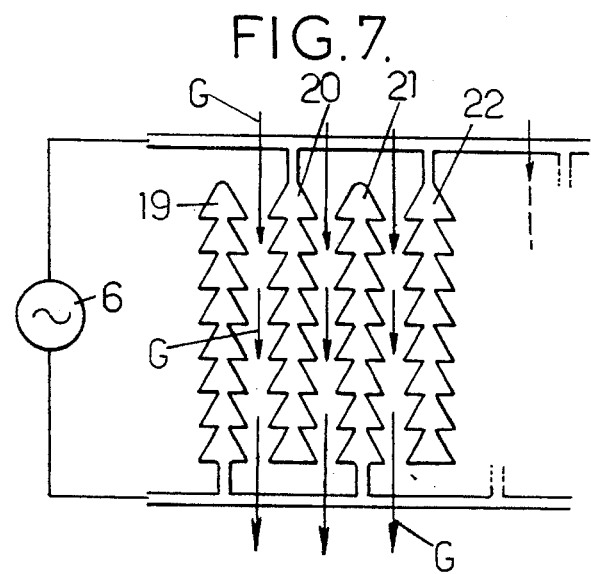

According to a further improved variant of the preceding one, diagrammatically represented in FIG. 7, the corridor C consists of a plurality of parallel corridors, the two side walls of which are identically striated; each of the successive electrodes 19, 20, 21, 22 . . . then consists of an elongate element which is striated on two opposite faces, respectively defining two adjacent corridors, which gives it the shape of a "Christmas tree".

In this case, the successive electrodes in question 19, 20, 21, 22, etc. are electrically connected in turn to the two terminals of the voltage generator 6, respectively at their feet, in the case of the first 19, the third 21, etc. and at their tops, in the case of the others 20, 22 etc. which are interposed between the first ones.

Here again, as in the case in FIG. 7, the electrodes or "Christmas trees" are advantageously placed between two insulating plates, the mutual distance between the electrodes being advantageously of the order of magnitude of the pitch of the striae forming the branches of the Christmas trees.

The arrows G in FIG. 7 show the direction of entrainment of the particles separated using such a structure, which makes it possible to provide a very large number of small asymmetric elementary separation patterns in a given space.

Figure 8:
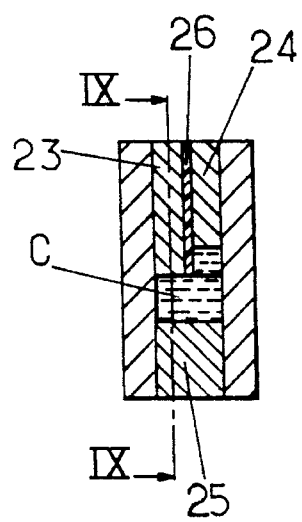
FIGS. 8 and 9 schematically show two mutually perpendicular sections, respectively along VIII—VIII, FIG. 9 and IX—IX, FIG. 8, of another variant according to the invention of the separation device in FIG. 1.
Figure 9:
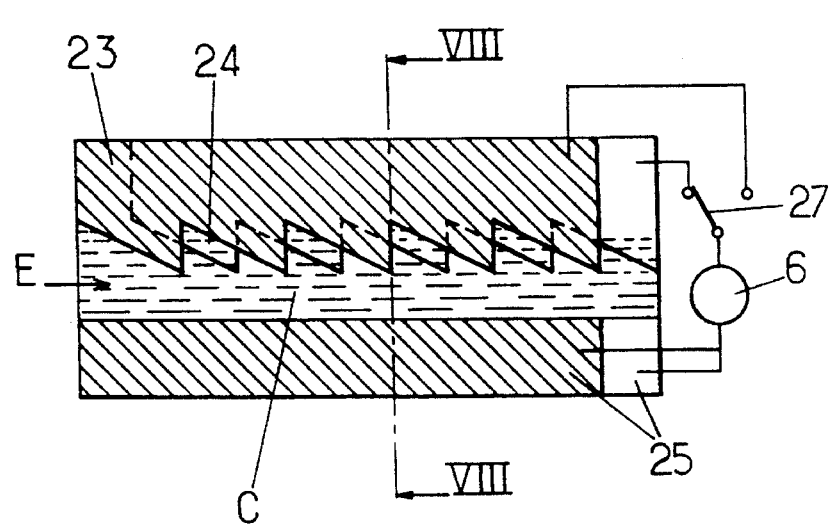

In an advantageous variant which has been diagrammatically represented in FIGS. 8 or 9, each striated electrode or "comb" (that is to say the single striated electrode in FIGS. 1 and 5 or each of the two striated electrodes in FIGS. 6 and 7), which electrode is here denoted by the reference 23, is split into two, that is to say that a second, identical striated electrode or "comb" 24 lies next to it, but offset along the direction E by one half striation - pitch.

The two combs 23 and 24 are associated with one and the same backing electrode 25 which lies on the other side of the corridor C.

The face of this backing electrode 25 which points towards the opposite combs (23, 24) may be smooth, as illustrated, or itself striated in a manner identical to those of the combs 23 and 24.

The two combs 23 and 24 are electrically insulated from each other, being advantageously juxtaposed side by side with interposition of a thin layer 26 of insulating material.

The two pairs of electrodes respectively consisting of the comb 23 and the backing electrode 25, on the one hand, and by the comb 24 and the backing electrode 25, on the other hand, are excited in turn, from the source 6 via a suitable switching device 27.

In this variant, powering up any one comb or "first comb" 23 (that is to say connecting the source 6 between this comb 23 and the corresponding backing electrode 25) fulfils a focussing role identical to that fulfilled by powering up the single comb 4 in FIG. 1.

However, between the successive powering-up phases of the said first comb, there is no longer a phase under an exciting field, corresponding to isotropic dispersion of the particles previously focussed: the dispersion phases are here replaced by new focussing phases which are governed by successive powering up of the second comb 24.

Figure 10:
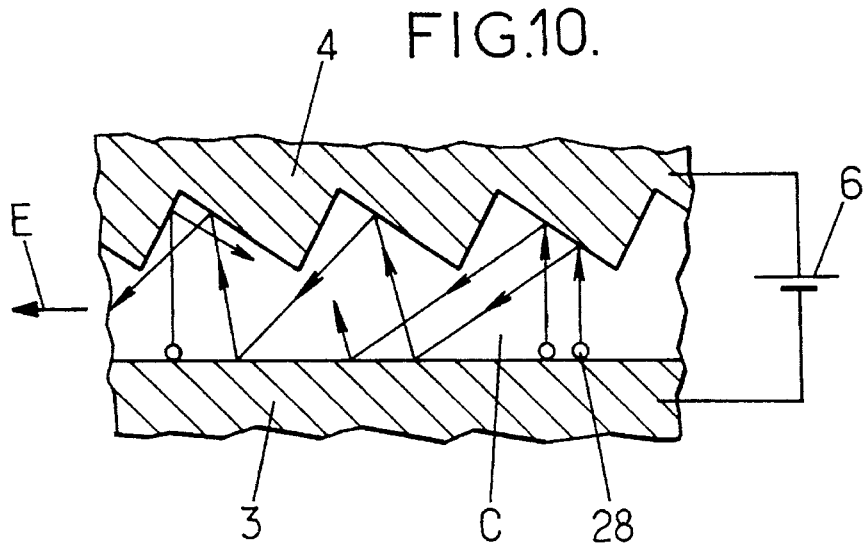
FIG. 10 shows another separation device according to the invention of the type shown in FIG. 1, but used differently.

In the variant diagrammatically represented in FIG. 10, the separation device is similar to that in FIG. 1.

Here, however, the particles to be separated are balls or grains 28 with larger diameter than before, this diameter lying between 0.5 and 5 mm and the particles being located in ambient air.

These balls or grains consist of any desirable material and in particular of metal, plastic or of mineral such as silica.

The two electrodes 3 and 4 are horizontal and here connected together by means of a source 6 which is here a DC electric potential difference source.

In the case where the grains 28 are made of metal, those in contact with the lower electrode 3 are progressively charged at the same polarity as this electrode.

As soon as the charge on such a grain exceeds a given threshold which corresponds to its weight, this grain rises until it touches the upper electrode 4.

This contact has the double effect of electrically discharging the said grain and causing it to undergo mechanical reflection from the electrode 4: it then falls back to the lower electrode 3 in a mechanically "reflected" direction with respect to the direction of its prior rise.

It is clear that, statistically, because of the asymmetry of the patterns, the reflections carried out on the striated surface of the electrode 4 result in a majority displacement of the reflected particles in the direction of the arrow E in FIG. 10, and that the resulting degree of entrainment depends on the characteristics (especially diameter) of the grains in question.

In other words, the "pumping" observed is then essentially due to the mechanical reflections of the grains 28 on the asymmetric slopes of the patterns when these grains are displaced by the transverse electric field.

The operation of this variant is in accordance with the general definition of the invention given hereinabove.

It may in fact be considered that a transverse electric field of given polarity is applied onto each grain 28 during its charging in the vicinity of the lower electrode 3, then during its rise towards the other electrode 4, and that this field is "interrupted" (being inverted) as soon as the said grain enters into contact with the said upper electrode 4, then during the descent of the grain until it again comes into contact with the lower electrode 3, which initiates its electrical recharging at the above first polarity, and so, on: repetitive interruption of the exciting field in question is therefore indeed observed.

An entirely similar reasoning might be adopted if the grain 28 in question were to consist of an insulating material rather than a conducting material.

In all cases, it may be advantageous to line the opposite faces of the electrodes with an anti-adhesive product which prevents adhesion of the particles to be separated against them.

As a result of which, and whatever the embodiment adopted, methods and devices are finally obtained for separating particles contained in a fluid, utilization and construction of which, respectively, result satisfactorily from the above description.

These methods and devices have numerous advantages compared to those of the prior art, especially as regards economy and ease of control, especially for the following reasons:

application of the polarizing or exciting field onto the total mass of fluid to be treated, contained in its treatment corridor, can be carried out transversely to this corridor, and not longitudinally between its two ends, which makes it possible to considerably reduce amplitude of the corresponding exciting parameter, this amplitude, in the case of which the said parameter is an electric voltage, being considerably reduced from several thousand volts to only a few volts, in order to apply, onto the entire mass of the fluid to be treated, contained in its treatment corridor, the polarizing or exciting field which has an asymmetric sawtooth distribution over the entire length of the said corridor, it is sufficient to generate such a unique field and apply it simultaneously to the entire length of each electrode or the like lying along the said corridor, the above distribution being integrally incorporated by a static configuration of the said electrode, which has precisely a longitudinal profile corresponding to the said distribution: in other words, it is not necessary to break down each electrode into a plurality of adjacent and independent electrodes supplied independently of each other.

As is obvious, and as moreover results from the preceding description, the invention is in no way limited to those of its methods of application and embodiments which have been more especially considered; on the contrary, it encompasses all variants thereof, especially those in which the exciting field is of a type other than electric, for example electromagnetic, optical or gravitational, the asymmetric patterns being for example, in the last case, reliefs of an essentially horizontal plate, this plate being itself vibrated by suitable means, the particles to be separated then having a tendency to migrate from pattern to pattern along the surface of the said plate.

We claim:

1. A separation device for separating, within a fluid, particles contained therein, comprising at least two electrodes facing each other and defining therebetween at least one separation zone in which said fluid is substantially stationary, and potential difference source means connected between said at least two electrodes for producing an electric field and thereby exciting particles in the separation zone, wherein at least one of the electrodes has a corrugated surface facing the separation zone and consisting, along a separation direction, of a sequence of asymmetric grooves transverse to said separation direction, means being provided for repetitively varying the excitation of the particles in the separation zone.

2. A device according to claim 1, wherein said corrugated surface has a groove spacing of a few thousands of angstroms to a few millimeters.

3. A device according to claim 1, wherein at least two electrodes lying alongside on a same side of the separation zone have respective corrugated surfaces consisting, along the separation direction, of identical sequences of asymmetric grooves, the respective sequences of said corrugated surfaces being offset with respect to each other along the separation direction, and wherein means are provided for alternatively connecting said at least two electrodes located on a same side of the separation zone to the potential difference source means.

4. A device according to claim 3, wherein the offset between said sequences is one half of a groove spacing in said sequences.

5. A device according to claim 1, wherein each separation zone is in the form of a corridor defined in part by two opposing electrode surfaces, at least one of which is corrugated, the mean distance between the two opposing electrode surfaces being of the order of magnitude of a groove spacing of said corrugated surface.

6. A device according to claim 5, wherein said two opposing electrode surfaces are identically corrugated and have respective grooves lying in front of each other.

7. A device according to claim 6, wherein the corridor consists of a plurality of mutually parallel corridor sections, an electrode lying between two adjacent parallel corridor sections being in the form of a part lined with corrugations on two parallel opposite faces thereof, which give it a general elongate Christmas-tree shape.

8. A device according to claim 1, wherein the electrodes have been subjected to a surface treatment for preventing adhesion thereto by said particles.

9. A device according to claim 1, wherein said means for repetitively varying the excitation of the particles in the separation zone comprise means for varying an amplitude of the electric field in the separation zone.

10. A device according to claim 9, wherein said means for varying the amplitude of the electric field are arranged to create a repeated sequence of operating cycles, each cycle being composed of a first phase, extending over a first period, in which a pulse of the electric field is simultaneously applied over the entirety of each separation zone, and a second phase, extending over a second period, in which said electric field is cancelled.

11. A device according to claim 10, wherein the second period of each cycle has a duration of the same order of magnitude as, or shorter than, a diffusion time of the particles in said fluid over a distance equal to a groove spacing of said corrugated surface.

12. A device according to claim 9, wherein said means for varying the amplitude of the electric field are arranged to apply said electric field to each separation zone as a sinusoidal signal having a time period chosen on the basis of the particles to be separated.

13. A device according to claim 1, wherein said means for repetitively varying the excitation of the particles in the separation zone are arranged to vary the sensitivity of said particles to the electric field.

14. A device according to claim 13, comprising means for superposing a sensitizing field on the electric field over each separation zone, which sensitizing field is capable of temporarily inducing transition of said particles from a ground state to a state in which their sensitivity to the electric field is different from that which they have in the ground state.

15. A device according to claim 1, wherein each groove of said corrugated surface has the shape of an asymmetric V.

16. A device according to claim 15, wherein the asymmetry of each V, expressed as a ratio of the width of the less steep side thereof to the width of the steeper side thereof is of the order of 10.

* * * * *